US010324706B1

(12) United States Patent
Schrader et al.

(10) Patent No.: US 10,324,706 B1
(45) Date of Patent: Jun. 18, 2019

(54) AUTOMATED SOFTWARE DEPLOYMENT FOR ELECTROMECHANICAL SYSTEMS

(71) Applicant: Amazon Technologies, Inc., Seattle, WA (US)

(72) Inventors: Karl Eric Schrader, Snohomish, WA (US); Zameer Merali, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 32 days.

(21) Appl. No.: 15/590,917

(22) Filed: May 9, 2017

(51) Int. Cl.
  *G06F 9/44* (2018.01)
  *G06F 8/65* (2018.01)
  *G06F 9/4401* (2018.01)

(52) U.S. Cl.
  CPC .............. *G06F 8/65* (2013.01); *G06F 9/4406* (2013.01); *G06F 9/4416* (2013.01)

(58) Field of Classification Search
  CPC ......... G06F 8/65; G06F 9/4406; G06F 9/4416
  USPC .................................................. 717/168–178
  See application file for complete search history.

(56) References Cited

U.S. PATENT DOCUMENTS

| 7,318,173 | B1 * | 1/2008 | Falik | ...................... | G06F 9/4401 713/1 |
| 7,664,836 | B2 * | 2/2010 | Kim | ...................... | G06F 9/4416 709/222 |
| 2004/0042269 | A1 * | 3/2004 | Tamura | ............... | G11C 11/5628 365/185.12 |

OTHER PUBLICATIONS

Anton et al., "Firmware and bootloader", Mar. 2012, download from https://rose.telecom-paristech.fr/2012/wp-content/uploads/2012/03/Firmwares-and-bootloaders.pdf , 13 pages. (Year: 2012).*
ST, "AN3990 Application note—Upgrading STM32F4DISCOVERY board firmware using a USB key ", 2011, STMicroelectronics, 14 pages. (Year: 2011).*

* cited by examiner

*Primary Examiner* — Ted T. Vo
(74) *Attorney, Agent, or Firm* — Kilpatrick Townsend & Stockton LLP

(57) ABSTRACT

Techniques for distributing updated executable instructions for machine controller systems may be described herein. For example, a machine controller system may initiate or execute into a boot-loader environment, in response to a first boot cycle, that is configured to communicate with a server computer and receive one or more portions of code. The one or more portions of code may be received and compiled into executable instructions which may be updated executable instructions for the machine controller system. The updated executable instructions may be stored in the external memory of the machine controller system thereby overwriting any previously stored executable instructions. A pointer file of the external memory may be updated to re-direct to the updated executable instructions which may be applied to the machine controller system in response to a second boot cycle of the machine controller system.

20 Claims, 8 Drawing Sheets

AUTOMATED SOFTWARE DEPLOYMENT FOR ELECTROMECHANICAL SYSTEMS

BACKGROUND

Conventional machine controller systems are configured to continuously monitor the state of various input devices and make decisions using custom or vendor-specific programming to control the state of various output devices. Machine controller systems are designed to be stable and hardy to support the input/output devices in a variety of volatile environments such as refineries, warehouses, or manufacturing facilities. As the machine controller systems provide continual operations, updating the programming logic or code of the system can be difficult as any interruption in the services provided by associated electromechanical devices could be dangerous or costly to the corresponding facility. Compounding the problem is the fact that each machine controller system may utilize a different vendor specific integrated development environment (IDE) necessitating different code or logic to solve the same problem across various machines. Applying the updated logic to the machine controller system can be expensive and inefficient as specific technicians with particular knowledge are required to correctly update each individual machine controller system.

BRIEF DESCRIPTION OF THE DRAWINGS

Various embodiments in accordance with the present disclosure will be described with reference to the drawings, in which.

DETAILED DESCRIPTION

Figure 1:
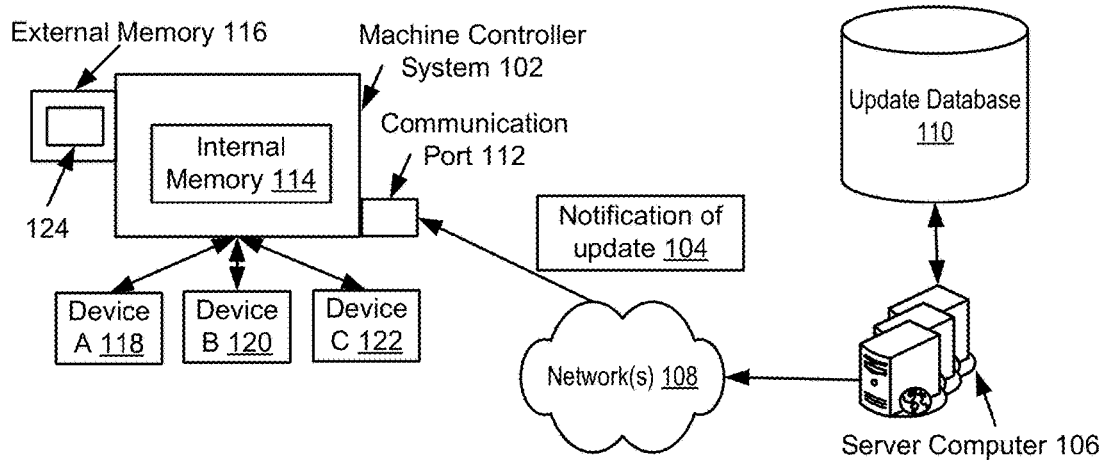
FIG. 1 illustrates an example workflow for a feature for distributing automatic updates to controller systems implemented by a server computer for a machine controller system, in accordance with at least one embodiment.
Figure 1:
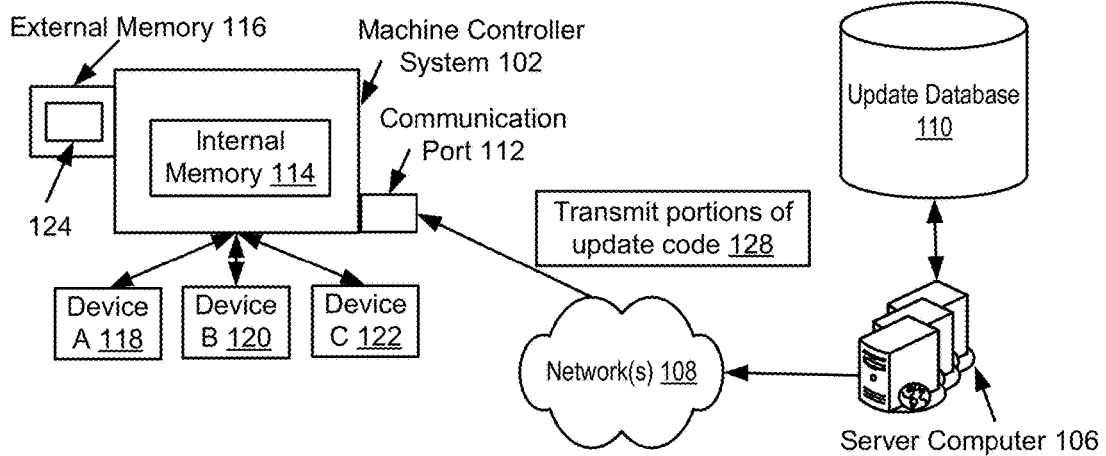

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide a feature for distributing automatic updates to controller systems or machine controller systems (e.g., a programmable logic controller (PLC)) that leverages an automatic roll-back feature that can be used to roll back to a last known good configuration of the machine controller system stored in associated external memory of the machine controller system. More specifically, techniques described herein provide for automatically distributing and implementing updates for the program logic, code, or executables of the machine controller system by overwriting the last known good configuration that is stored in the external memory with a new updated version of the code, logic, or executable. In some cases, the executables can be transmitted in portions to the machine controller system. In accordance with at least one embodiment, a boot-loader executable of controller systems may be leveraged to communicate, upon a boot or power cycle, with a server computer to receive the portions of code or binary files via a network that are then compiled locally at the controller system into executable instructions for the controller system. The compiled executable instructions can represent an update to the previously utilized or locally stored executable instructions for the machine controller system. In embodiments, the controller system may be configured to store the newly built or compiled executable instructions within the external memory which may be utilized, applied, and/or installed upon a further boot or power cycle of the controller system such that the instructions utilized by the controller system represent an up-to-date version or recently patched version of the executable instructions for the controller system.

In embodiments, a pointer file located in the external memory of the machine controller system may be updated to point to a boot-loader executable. Instructions may be provided to an entity to power cycle, restart, or boot cycle the machine controller system which, upon restarting, results in the machine controller system initiating the boot-loader environment. The boot-loader environment may be configured to receive and compile the portions of code or binary files into executable instructions or an executable. The executables are configured to update and replace the previously stored executable instructions maintained in the external memory of the machine controller system. In embodiments, a server computer that implements the feature for distributing automatic updates to controller systems may transmit unique identification information to the machine controller system for use in verifying the portions of files or code received and in compiling the code or files in the correct order. The machine controller system may update the pointer file a second time to re-direct the pointer of the external memory to the recently downloaded and compiled or recently built executable instructions. Thereafter, a second power cycle or boot cycle may be executed with the machine controller system and the machine controller system can apply the newly updated executable instructions upon resuming power.

In accordance with at least one embodiment, a server computer implementing the a feature for distributing automatic updates to controller systems may transmit or communicate over an available network portions of code or binary files that represent the complete updated executable instructions so as to not overload or affect the stability of the machine controller system that may have limited bandwidth and computing power to process a large update file. Each IDE of various machine controller systems may be leveraged to compile and store the update files or executables in the corresponding external memory of the machine controller systems as each of the various IDEs can be configured to write to the corresponding external memory of an associated machine controller system. A machine controller system may be implemented as analog, digital, or mixed analog digital processing circuitry to direct the operation of an electromechanical system. An example of a machine controller system may be a programmable logic controller (PLC) or any suitable machine controller system that includes a real-time system which controls outputs that are required to be produced in response to control input conditions within a limited period of time or unintended operation of corresponding electromechanical devices or systems may occur. An electromechanical device or system may include sorting, packaging, and label application lines, manufacturing and tooling lines, robotic assembly lines, as well as other suitable automated systems. In some embodiments, the server computer may generate and transmit instructions that are specific for an IDE of a machine controller system for updating the pointer file of the external memory to re-direct to the boot-loader executable. In embodiments, the machine controller systems and external memory may be commissioned or provisioned with the pointer file already directed to a pre-loaded or pre-configured boot-loader executable for the machine controller system.

In embodiments, the controller system may utilize received unique identification information for the updated code or files to verify or authenticate the code or files received from the server computer to ensure security and reliability of the update. Each portion of the updated code or files may be verified or authenticated by communicating with the server computer using hashes, checksums, file sizes, or file names provided by the server computer to ensure that files being received and compiled are correct and being compiled in the correct order. Once the external memory of the machine controller system has had the pointer file updated to direct to the boot-loader environment a notification may be provided to entities or associates interacting with the machine controller system about the update. Thereafter, the associate or entity may select an appropriate time to power cycle or restart the machine controller system so as to avoid unnecessary stoppages of input/output operations controlled by the machine controller system or other dangerous consequences that could occur by inadvertently restarting the machine controller system at an inappropriate time. In accordance with at least one embodiment, machine controller systems may lack internally stored executable instructions and instead be configured to utilize executable instructions that are stored in a remote location such as over a network in a server. For example, the internal memory of the machine controller system may lack an operating system or other executable instructions for operating the various input/output devices associated with the machine controller system. Instead, upon a power cycle, the external memory would initiate the boot-loader environment which would communicate with the server computer to receive the most up to date executable instructions for the machine controller system. The internal memory and IDE of the machine controller system may build or compile received portions of the executable instructions in the external memory which may apply the compiled executable instructions upon a second power cycle. In such embodiments, the internal memory of the machine controller system may be volatile and smaller than conventional machine controller systems as the executable instructions required to operate the machine controller system may be remotely communicated to the machine controller system upon each power cycle. Further, the executable instructions transmitted to such machine controller systems may be continually updated prior to communicating with the machine controller system such that on each power cycle the machine controller system is receiving the most up to date executable instructions that are particular to the machine controller system.

As a sample illustration, the automated distribution update feature implemented by a server computer may identify that an update is required for a PLC configured to operate a plastic sorting mechanism. A notification may be provided to an entity associated with the PLC notifying the entity about the update for the PLC. In response to the notification the entity may interact with the PLC to power cycle or boot cycle the PLC. In response to the first power cycle the external memory of the PLC may initiate a boot-loader environment that is configured to communicate with the server computer to receive and verify portions of binary files or code for updating the PLC. The server computer may transmit the portions of binary files or code to the PLC along with unique identification information for use in verifying the binary files or code and compiling by the PLC. The PLC's IDE may be configured to compile and write and/or store executable instructions derived from the portions of binary files or code to the external memory. The instructions provided to the PLC's IDE may also update the pointer file of the external memory to re-direct to the recently updated executable instructions stored in the external memory. Thereafter, upon a further power or boot cycle, the PLC may update and/or apply the updated executable instructions to the PLC thereby improving the input/output operations for the plastic sorting mechanism.

The processes and systems described herein may be an improvement on conventional machine controller system update processes and systems. For example, a typical update for a machine controller system is a lengthy and costly process for the owner of the machine controller system as the system must be down for a lengthy period of time and usually requires a specialized technician or associate to initiate, conduct, and complete an update of the machine controller system. The input and output operations lost while updating the machine controller system along with the monetary cost of hiring the specialized technician result in a large monetary loss for the owner or operator of the machine controller system. Conventional operators or entities implementing machine controller systems will typically refuse or delay the updating of the machine controller systems to avoid such costs or potential damage caused by an update to the executable instructions of the machine controller system. Further, conventional machine controller system update features lack the capability to ensure that the same instructions or executable are being utilized by the same machine controller systems at various geographical locations let alone the same physical worksite or facility. Associates or entities interacting with the machine controller system may apply changes to the code of the machine controller system, via the IDE, which cause the particular machine controller system to execute differently than another similar machine controller system. Various vendors of machine controller systems may utilize different IDEs which results in different code or instructions to achieve the same desired result across machine controller systems operated or owned by an entity thereby adding to the confusion and cost of updating the machine controller systems.

The improvements described herein increase the likelihood of updating the machine controller systems and ensuring uniformity of instructions utilized by the machine controller systems operated or associated with an entity. Operators or owners of machine controller systems can avoid hiring specialized technicians to oversee updates to the systems and instead rely on the notification of an update and the ability of an associate to restart, power cycle, or boot cycle a machine controller system to update and apply updated executable instructions to the PLC in a safe manner. The operators can still select when they would like to apply the update but can do so in a more efficient manner as the process will take less time as the IDE compiles the portions of updated code or files and stores the updated executable instructions in the external memory of the machine controller system that will be applied upon a further power cycle. Further, stability and security can be achieved by utilizing the unique identification information provided to the machine controller systems by the server computer to verify each portion of code or file prior to compiling the executable instructions.

FIG. 1 illustrates an example workflow for a feature for distributing automatic updates to controller systems a implemented by a server computer for a machine controller system, in accordance with at least one embodiment. The workflow 100 of FIG. 1 includes a machine controller system 102 (such as a PLC) receiving a notification of update 104 from a server computer 106 via networks 108. The server computer 106 may be configured to implement the feature for distributing automatic updates to controller systems described herein and may communicate with a database such as update database 110. The update database 110 may include information such as identification information of the machine controller systems that includes vendor specific information such as model information, IDE specification, communication protocols, geographical location of the machine controller system 102, and current version of executable instructions utilized. In accordance with at least one embodiment, the server computer 106 may communicate with the machine controller system 102 via a corresponding communication port 112 via networks 108. The communication port 112 and networks 108 may enable communication using suitable network communication protocols such as transmission control protocol/internet protocol (TCP/IP) or internetwork packet exchange/sequenced packet exchange (IPX/SPX). In embodiments, the notification of update 104 may be transmitted to the machine controller system 102 for display and presentation via a corresponding user interface to an entity associated with the machine controller system. In some embodiments, the notification of update 104 may be provided to a user device such as laptop, desktop, mobile phone, or other personal computing device of the entity via an email, a short message service (SMS) message, or an application notification.

The machine controller system 102 of FIG. 1 includes internal memory 114, external memory 116 and is configured to operate (perform input/output operations) for devices A 118, B 120, and C 122 via a corresponding field bus (not pictured). The internal memory 114 may contain executable instructions for operating input and output operations for devices 118-122 as well as IDE specific instructions for communicating with the external memory 116 such as writing files or accessing files of the external memory 116. In embodiments, the external memory 116 may include a back-up or last known good configuration of executable instructions 124 that may be utilized by the machine controller system 102 in case of inappropriate code instructions provided by an entity that result in unintended operation of devices 118-122, technical problems, or sudden power outages. The external memory 116 may also include a pointer file that points to the last known good configuration or back-up 124. In accordance with at least one embodiment, instructions may be provided to the machine controller system 102 from the server computer 106, via the networks 108 and communication port 112, to modify or update the pointer file of the external memory 116 to re-direct to a boot-loader executable of the external memory 116 at 126. The boot-loader executable may be configured to receive and verify portions of code or binary files provided by the server computer 106 to compile updated executable instructions for the machine-controller system. Upon a first boot cycle or power cycle, the machine controller system 102 defaults to the external memory whose updated pointer file executes or initiates the machine controller system 102 in a boot-loader environment.

In the workflow 100, the server computer 106 may transmit portions of code or binary files 128, retrieved from update database 110, to the machine controller system 102 via networks 108 and communication port 112. In embodiments, the server computer 106 may transmit unique identification information such as information generated by executing a hash or checksum using the file name or other attribute for each portion of code or file provided to the machine controller system 102. The initiated boot-loader environment of the machine controller system 102 enables the machine controller system 102 to verify the received files or code using the unique identification information and compile the files or code into updated executable instructions that will be written or stored in the external memory 116 and thereby overwrite the back-up or last known good configuration 124 currently stored in the external memory 116. Each updated code or binary files may be selected and transmitted in such a way as to be specific to the IDE of the machine controller system including variables and instructions required to properly update each IDE of various machine controller systems.

In embodiments, the server computer 106 may be an entity of a multiple entity implementation or a fleet of server computers (not pictured). In such implementations, one entity or server computer (such as server computer 106) may be configured to identify when an update to the executable instructions for the machine controller system 102 is available as well as generate the unique identification information that is utilized in verifying the files or portions of code transmitted to the machine controller system 102. Another entity or server computer may be configured to transmit the portions of update code 128 to the machine controller system 102 via networks 108 and be in communication with server computer 106 to identify the appropriate files to select for transmittal to the machine controller system 102 to update the executable instructions. In accordance with at least one embodiment, the transmitted portions of update code 128 may be portions of binary files or code that are utilized by the machine controller system 102 to update the executable instructions for devices A 118, B 120, or C 122. In such embodiments, the machine controller system 102 may apply the updates to the devices 118-122 upon a power cycle or boot cycle of the machine controller system 102. Further, unique identification information may be provided to the machine controller system 102 to verify the portions of code or binary files for authenticity prior to compiling them into executable instructions or updates to portions of existing code for the devices 118-122. In embodiments, the server computer 106 may be configured to communicate the portions of update code 128 to the devices 118-122 via the networks 108 without communicating with the machine controller system 102.

Figure 2:
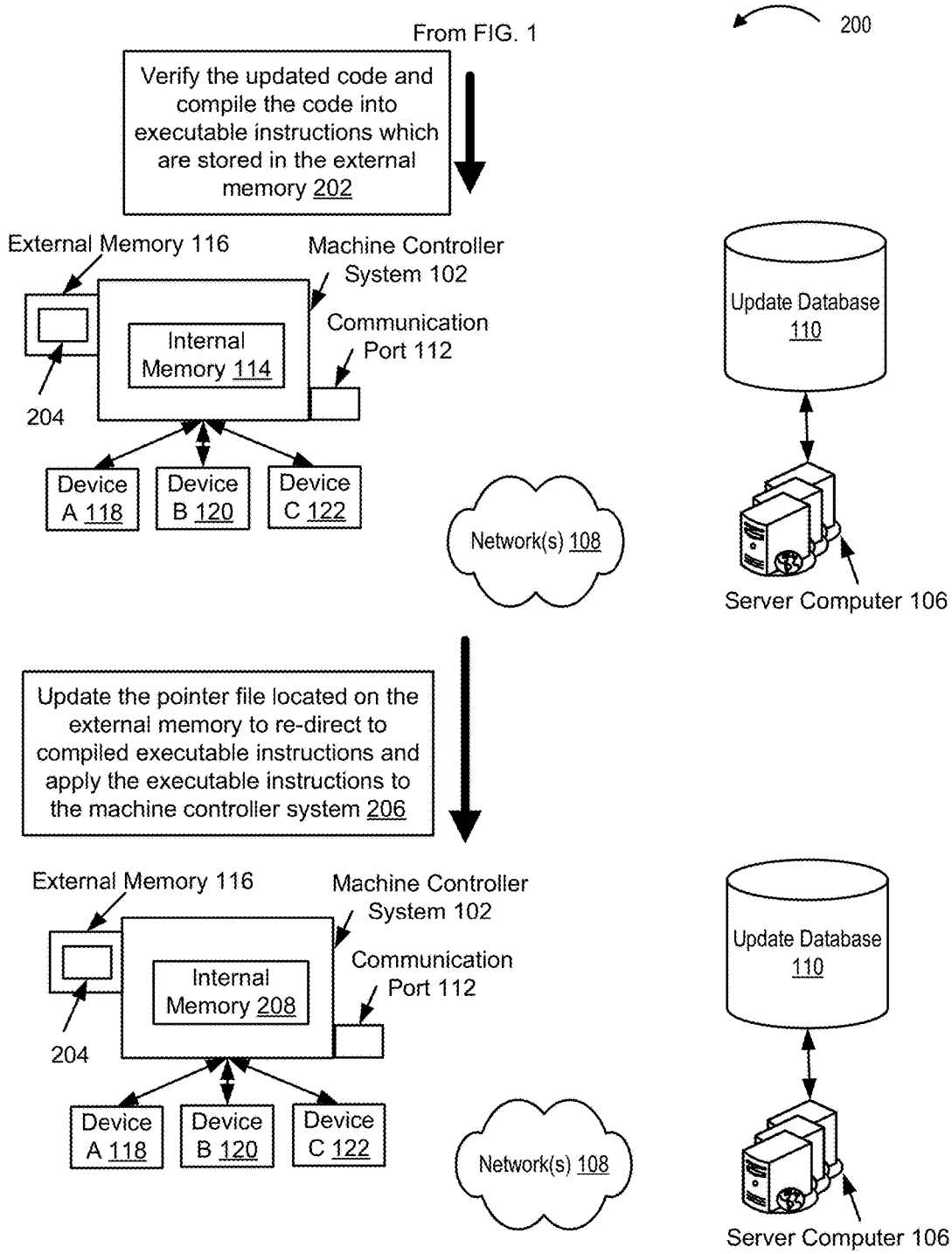
FIG. 2 illustrates an example workflow for a feature for distributing automatic updates to controller systems feature implemented by a server computer for a machine controller system, in accordance with at least one embodiment.

FIG. 2 depicts a continuation of the workflow 100 of FIG. 1 as workflow 200 of FIG. 2 for the feature for distributing automatic updates to controller systems described herein. At 202 of the workflow 200, the machine controller system 102 may, in the boot-loader environment, verify the updated code or files and compile the code into executable instructions which are stored in the external memory 116 as updated executable instructions 204. In embodiments, each IDE of machine controller systems, such as machine controller system 102, may be configured to compile the portions of update code 128 into appropriate executable instructions for the corresponding machine controller system. In some embodiments, compiling the portions of update code 128 can include combining or re-combining the portions of code or binary files into a correct order that represent the executable instructions upon being compiled together. In such implementations, the unique identification information provided by server computer 106 may be utilized to ensure that the files are combined in the correct order. The updated executable instructions 204 may overwrite or otherwise replace the previously stored back-up executable instructions 124. Thus, upon a further power or boot cycle, the mechanisms of the machine controller system 102 will cause it to search for the last known good configuration 124 but instead find the newly updated executable instructions 204 to apply and execute for the machine controller system 102 thereby effectively updating the instructions for the machine controller system 102 and how it operates devices 118-122.

In accordance with at least one embodiment, at 206 the pointer file of the external memory 116 may be updated to re-direct to the recently compiled and updated executable instructions 204. As described above, upon a second or further power cycle or boot cycle, the updated executable instructions 204 will be applied or installed to the machine controller system 102. In embodiments, the updated executable instructions 204 may update the version stored in internal memory 114 thereby creating an updated executable instructions stored in internal memory 208 (to reflect the update from 114) and in external memory 116. Thus, previously functionality of having a last known good configuration or back-up stored in external memory 116 may be maintained as the external memory still stores the compiled executable instructions 204 in case of future inadvertent code changes to the IDE of the machine controller system 102, technical difficulties, or unexpected power outages. In accordance with at least one embodiment, the machine controller system 102 may be configured to provide or transmit information indicating that a successful update has been applied to the server computer 106 which may update records in the update database 110 to reflect which version of executable instructions is currently applied or being executed by the machine controller system 102. This information may be utilized to ensure uniformity of versions of executable instructions applied to a plurality of similar machine controller systems operated by an entity, to enable security of the instructions executed by the machine controller systems, and to avoid unnecessary update procedures that may cause a greater delay in operations of devices 118, 120, and 122. Upon applying, installing, or executing the updated executable instructions 204, the machine controller system 102 may operate or be configured to operate in a more efficient, safe, or stable manner while interacting with devices 118-122.

Figure 3:
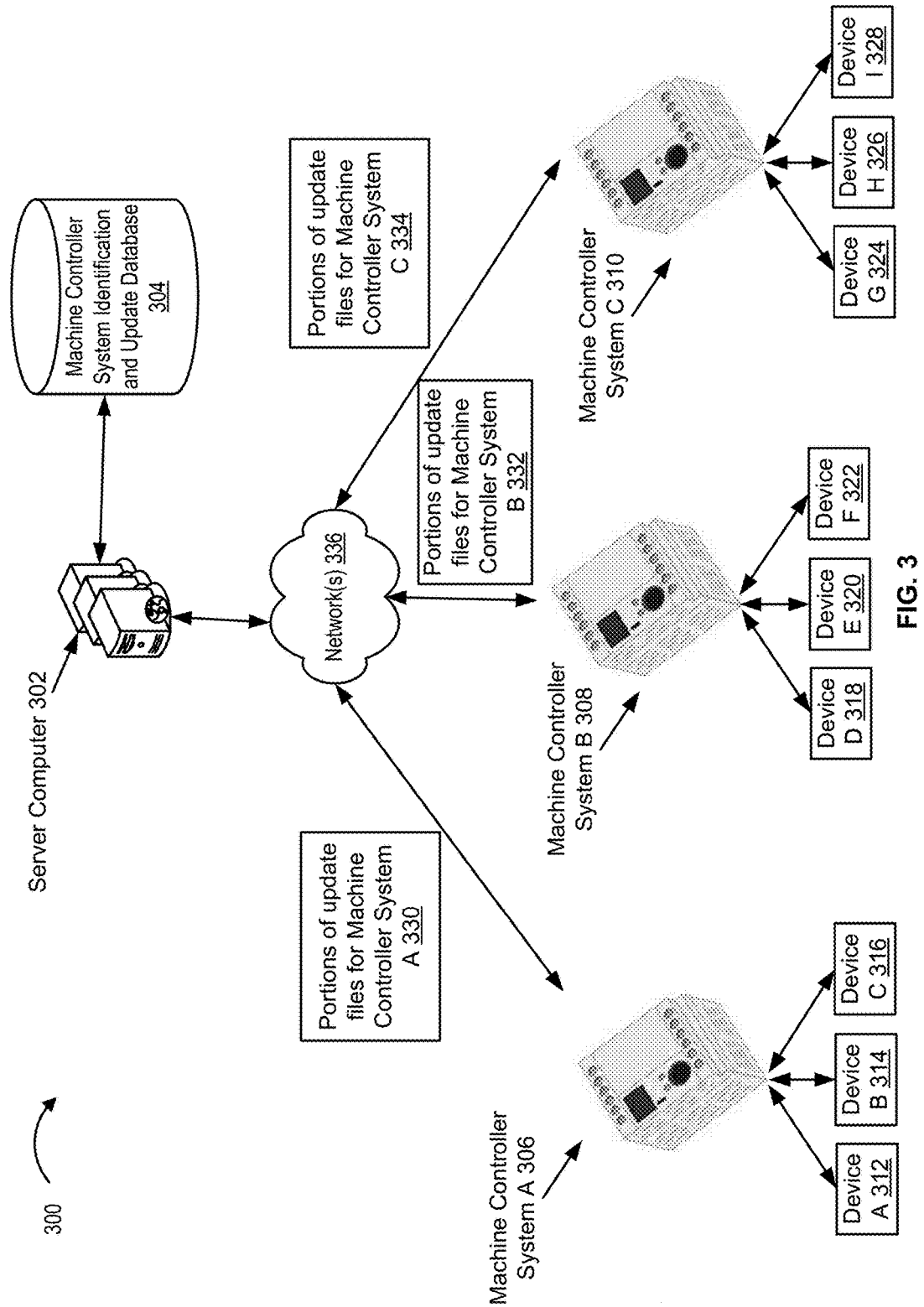
FIG. 3 illustrates an example of distributing updates to a plurality of machine controller systems by a server computer and via a network, in accordance with at least one embodiment.

FIG. 3 illustrates an example workflow for distributing updates to a plurality of machine controller systems by a server computer and via a network, in accordance with at least one embodiment. The workflow 300 of FIG. 3 includes a server computer 302 in communication with a machine controller system identification and update database 304. The server computer 302 that implements the feature for distributing automatic updates to controller systems described herein may maintain records that indicate required or necessary updates for various machine controller systems such as machine controller systems 306-310. In embodiments each machine controller system 306, 308, and 310 may each represent a machine controller system provided by different vendors. For example, machine controller system A 306 may be manufactured by Vendor A and configured to utilize a particular vendor specific IDE whereas machine controller system B 308 may be manufactured by Vendor B and configured to utilize a particular but different vendor specific IDE than the IDE utilized by machine controller system A 306 and Vendor A. The server computer 302 may maintain information such as information indicating a current version of executable instructions utilized by machine controller system A 306. The server computer 302 may utilize the information of database 304 to determine that a newer or updated version of executable instructions are available for the machine controller system A 306 by comparing version numbers. In some embodiments, an entity associated with the server computer 302 may determine and flag that an update is available for the machine controller system A 306. FIG. 3 also includes machine controller system A 306 operating devices A 312, B 314, and C 316, as well as machine controller system B 308 operating devices D 318, E 320, and F 322, and machine controller system C 310 operating devices G 324, H 326, and I 328. The server computer 302 may identify updates required or available for each of the machine controller systems A 306, B 308, and C 310. Each machine controller system 306-310 may be provided by a different vendor and each associated device (such as devices 318-322) may be different between the machine controller systems.

In accordance with at least one embodiment, the server computer 302 using information of database 304 may identify and generate the portions of binary files or code required to appropriately update each different machine controller system 306, 308, and 310. As described herein, upon the boot-loader environment being initiated or executed by each machine controller system 306, 308, and 310, the server computer 302 may begin transmitting portions of update files 330, 332, and 334, via networks 336 to machine controller systems 306, 308, and 310, respectively. Each portion of updated files or code 330, 332, and 334 may include variable updates or instructions that are specific to the intended machine controller system such that instructions or variable updates included in updated files 330 may be different from variable updates or instructions included in updated files 332. The server computer 302 selects and transmits the appropriate portions for each machine controller system according to the IDE utilized by each machine controller system. The server computer 302 may provide the updated portions of files 330, 332, and 334 to machine controller systems 306-310 that may be located in the same facility, different facilities in a proximal geographical location, or in varied or distant geographical locations from each other by leveraging available network communication channels. In accordance with at least one embodiment, the server computer 302 may provide the updated portions of code or update files 330, 332, and 334, via networks 336, to a proxy server that may be geographically proximal to the physical location of the machine controller systems 306-310 individually or in aggregate.

Figure 4:
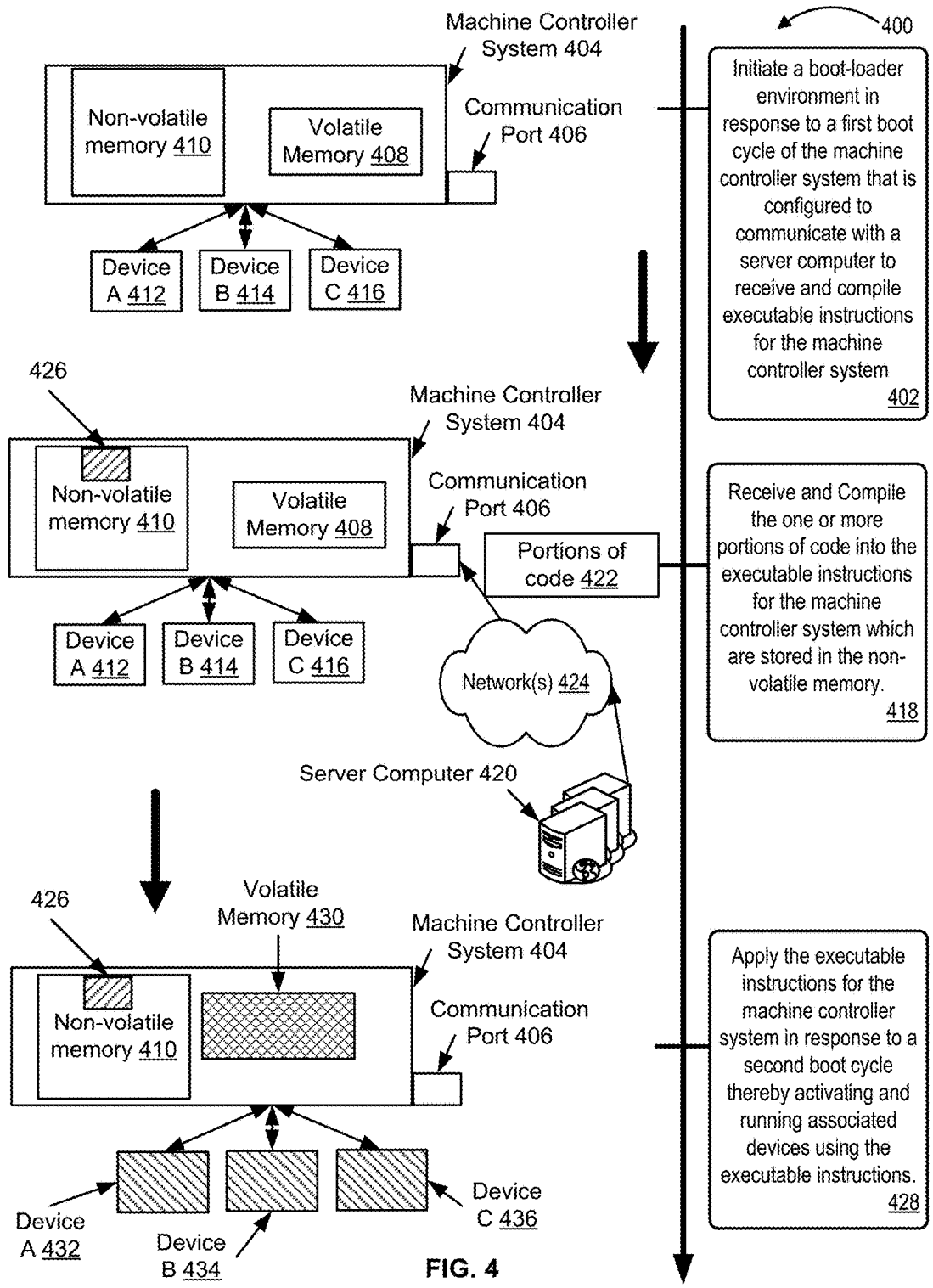
FIG. 4 illustrates an example workflow for a feature for distributing automatic updates to controller systems that includes retrieving the executable instructions for a machine controller system that lacks the executable instructions in the corresponding volatile memory of the machine controller system upon a power cycle, in accordance with at least one embodiment.

FIG. 4 illustrates an example workflow for a feature for distributing automatic updates to controller systems that includes retrieving the executable instructions for a machine controller system that lacks the executable instructions in the corresponding volatile memory of the machine controller system upon a power cycle, in accordance with at least one embodiment. The workflow 400 of FIG. 4 includes initiating a boot-loader environment in response to a first boot cycle of a machine controller system at 402. In embodiments, the boot-loader environment may be configured to communicate with a server computer to receive portions of code or binary files and compile said portions of code or binary files into executable instructions for the machine controller system. FIG. 4 includes a machine controller system 404 that further includes a communication port 406, volatile memory 408, non-volatile memory 410, and operates devices 412, 414, and 416. The machine controller system 404 and volatile memory 408 may lack or not be provisioned with executable instructions required to operate devices 412-416. Instead, the non-volatile memory 410 may include a boot-loader executable configured to initiate a boot-loader environment that is configured to communicate with the server computer to receive and verify portions of binary files or code that may be utilized to compile executable instructions for the machine controller system 404. In embodiments, the volatile memory 408 may include or be an example of internal memory with respect to the machine controller system 404 while the non-volatile memory 410 may include or be an example of external memory with respect to the machine controller system 404. In accordance with at least one embodiment, the machine controller system 404 may be configured to utilize one or more portions of internal memory that may be comprised of both non-volatile and volatile portions. In such embodiments the machine controller system 404 may not utilize external memory. Instead, the compiled executable instructions would be stored in the non-volatile portions of the internal memory. External memory may include memory that is external to the machine controller system 404 and/or external to the internal memory (i.e., stored within the machine controller system 404 yet separate from the internal memory).

The workflow 400 may include receiving and compiling the one or more portions of code into executable instructions for the machine controller system which are then stored in the non-volatile memory 410 at 418. FIG. 4 illustrates a server computer 420 transmitting the portions of code 422 via networks 424 to the communication port 406 of the machine controller system 404. As illustrated in FIG. 4, the non-volatile memory 410 may store the compiled executable instructions 426. In embodiments, the volatile memory 408 may be volatile yet utilized to receive and compile the portions of code 422 into the executable instructions 426 stored in non-volatile memory 410. The workflow 400 may include applying the executable instructions for the machine controller system in response to a second boot cycle thereby activating and running associated devices using the executable instructions at 428. FIG. 4 In embodiments, the pointer file of the non-volatile memory 410 may be updated to re-direct to the executable instructions 426 such that upon a power cycle the executable instructions 426 may be applied and run to configure the machine controller system 404 to operate devices 432, 434, and 436. In accordance with at least one embodiment, the volatile memory 430 of the machine controller system 404 may be configured to apply and execute the executable instructions 426 thereby activating and operating devices 432, 434, and 436. The volatile memory 430 may temporarily store and utilize the executable instructions 426 to operate devices 432-436 until a further power cycle upon which the volatile memory will 430 will erase the executable instructions. In response to a subsequent power cycle the non-volatile memory 410 and boot-loader executable will communicate with the server computer 420 to receive the executable instructions which may include an updated version of the executable instruction in an iterative process that is consistently seeking the executable instructions from the server computer 420 rather than storing a version of the executable instructions in volatile memory 430. Thus, the machine controller system 404 may utilize the most recent or up-to-date executable instructions upon power cycling as a locally stored version is not maintained but instead retrieved from the server computer upon power cycling and executing the boot-loader environment.

Figure 5:
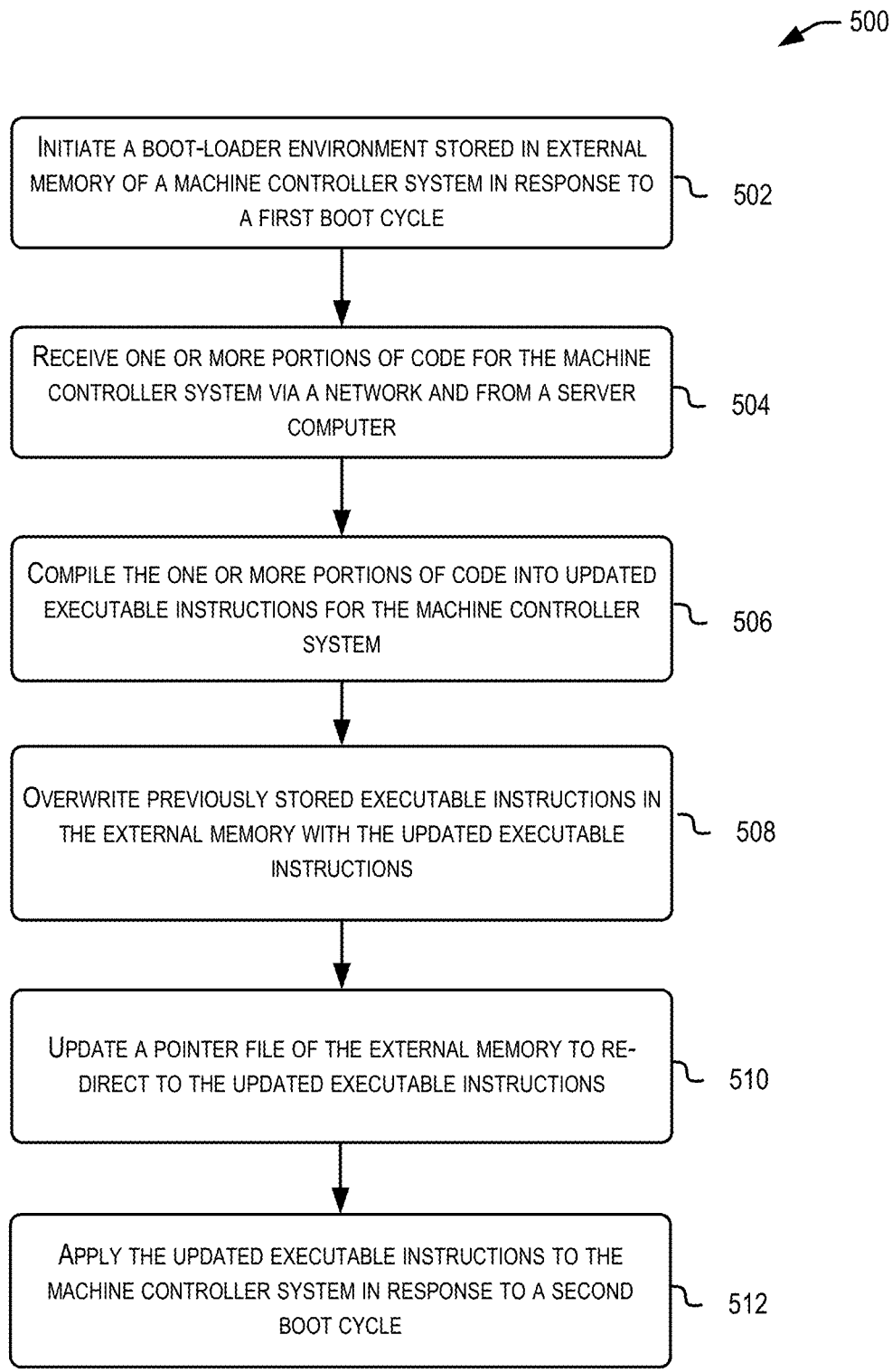
FIG. 5 illustrates an example flow chart for a feature for distributing automatic updates to controller systems, in accordance with at least one embodiment.
Figure 6:
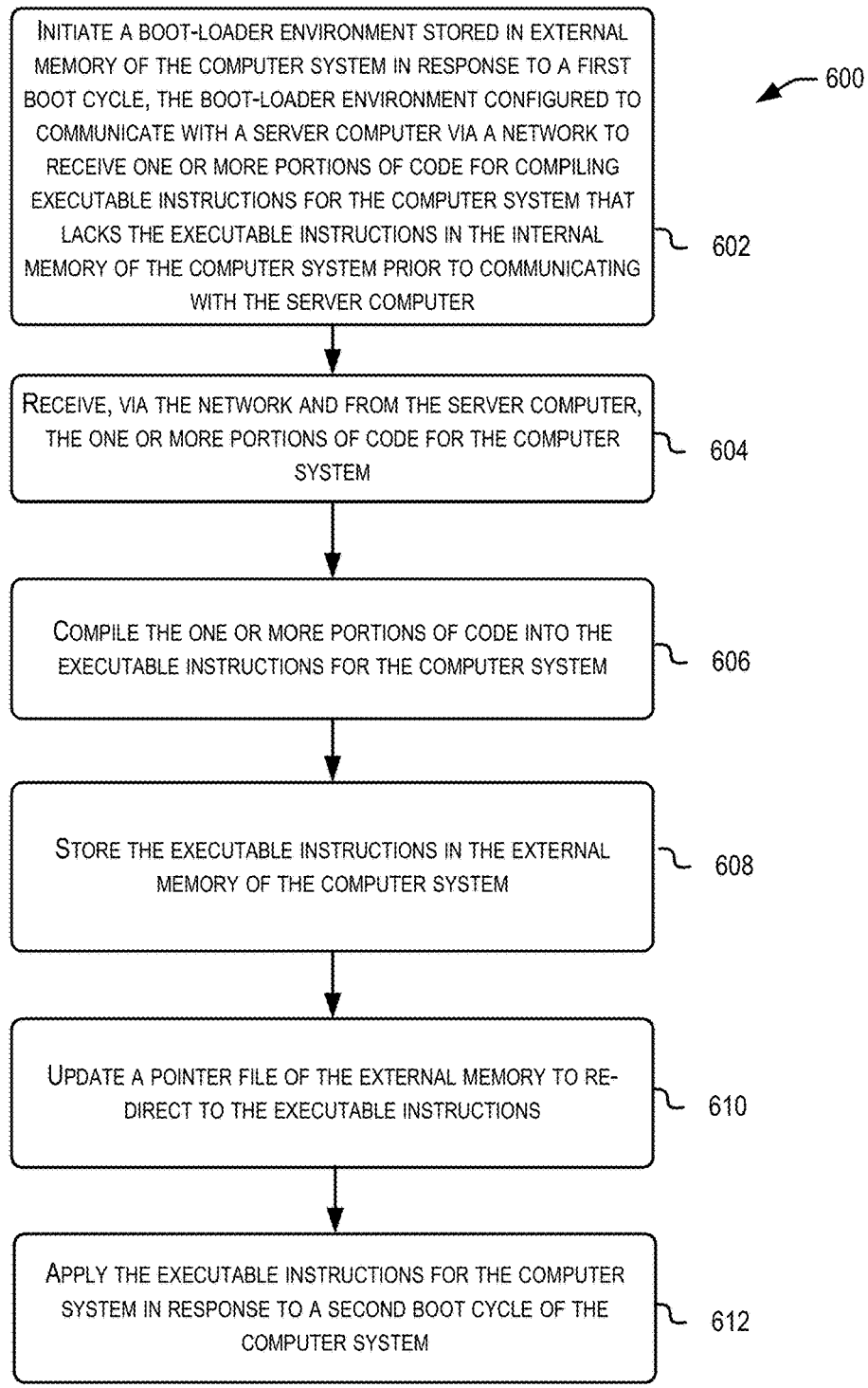
FIG. 6 illustrates an example flow chart for a feature for distributing automatic updates to controller systems, in accordance with at least one embodiment.

FIGS. 5 and 6 illustrate example flow charts for a feature for distributing automatic updates to controller systems, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory.

In some examples, the server computers 106, 302, and 420 utilizing at least the distribution module 730 of FIGS. 1-4 and 7 may perform the processes 500 and 600 of FIGS. 5 and 6. In FIG. 5, the process 500 may include initiating a boot-loader environment stored in the external memory of a machine controller system in response to a first boot cycle at 502. In embodiments, a notification of an update to the machine controller system may be provided to the machine controller system or to an entity or organization associated with the machine controller system. Instructions may be provided to the machine controller system which cause a pointer file of the external memory to re-direct to a boot-loader executable. The boot-loader executable initiates an environment that is configured to receive and validate code or binary files that may be built or compiled into executable instructions for the machine controller system. A server computer that communicates portions of the updated code or binary files may also provide unique identification information enabling the machine controller system to verify the received code or binary files prior to compiling and storing the executable instructions.

The process 500 may include receiving the one or more portions of code for the machine controller system via a network and from a server computer at 504. In accordance with at least one embodiment, a communication port of the machine controller system may communicate with the server computer to receive the one or more portions of code. In some embodiments, the one or more portions of code may be transmitted to the communication port and/or machine controller system via an secure communication channel that may utilize encryption/decryption techniques that are performed by a network security device associated with the machine controller system. The process 500 may include compiling the one or more portions of code into updated executable instructions for the machine controller system at 506. In embodiments, the process 500 may include overwriting previously stored executable instructions in the external memory with the updated and recently compiled executable instructions at 508. The process 500 may include updating the pointer file of the external memory to re-direct to the updated executable instructions at 510 such that upon a power cycle the machine controller system may apply the updated executable instructions. The process 500 may conclude at 512 by applying the updated executable instructions to the machine controller system in response to a second boot cycle. In accordance with at least one embodiment, the server computer may provide instructions to a power component, that may be external but associated with the machine controller system, that causes the first, second, and any other required power or boot cycles for the machine controller system. In some embodiments, the machine controller system and/or the external memory of the machine controller system may be provisioned with the boot-loader executable and the pointer file of the external memory may be updated by providing instructions to the machine controller system during operation and/or within the boot-loader environment.

The process 600 of FIG. 6 may include initiating a boot-loader environment stored in external memory of the computer system in response to a first boot cycle at 602. The boot-loader environment may be configured to communicate with a server computer via available networks to receive one or more portions of code or binary files that may be compiled into executable instructions for the machine controller system. In embodiments, a machine controller system may lack locally stored executable instructions but instead communicate with the server computer during the boot-loader environment to receive the portions of code that are compiled into executable instructions required to operate the machine controller system upon each power or boot cycle. The process 600 may include receiving the one or more portions of code for the computer system via the network and from the server computer at 604. The process 600 may include compiling the one or more portions of code into the executable instructions for the computer system at 606. The process 600 may include storing the executable instructions in the external memory of the computer system at 608. In accordance with at least one embodiment, storing the executable instructions in the external memory of the computer system may include overwriting or replacing previously stored executable instructions for the machine controller system. In accordance with at least one embodiment, storing the executable instructions in the external memory of the computer system may include storing the executable instructions (i.e., the updated executable instructions) in a different location in the external memory than the previously utilized executable instructions. Such implementations may be utilized to maintain a last known good configuration or back-up version of the executable instructions for the computer system in case of a validation error, a technical issue or error during the transmission of the portions of update code or binary files, and/or a disconnect from the server computer providing the portions of update code or binary files. In embodiments, the pointer file of the external memory may be updated to either re-direct to the updated executable instructions in cases where a successful installation and update has occurred or to the last known good configuration in cases where an unsuccessful installation or update has occurred. The process 600 may include updating a pointer file of the external memory to re-direct to the recently compiled and stored executable instructions at 610. In accordance with at least one embodiment, the process 600 may conclude at 612 by applying the executable instructions for the computer system in response to a second boot or power cycle of the machine controller system.

Figure 7:
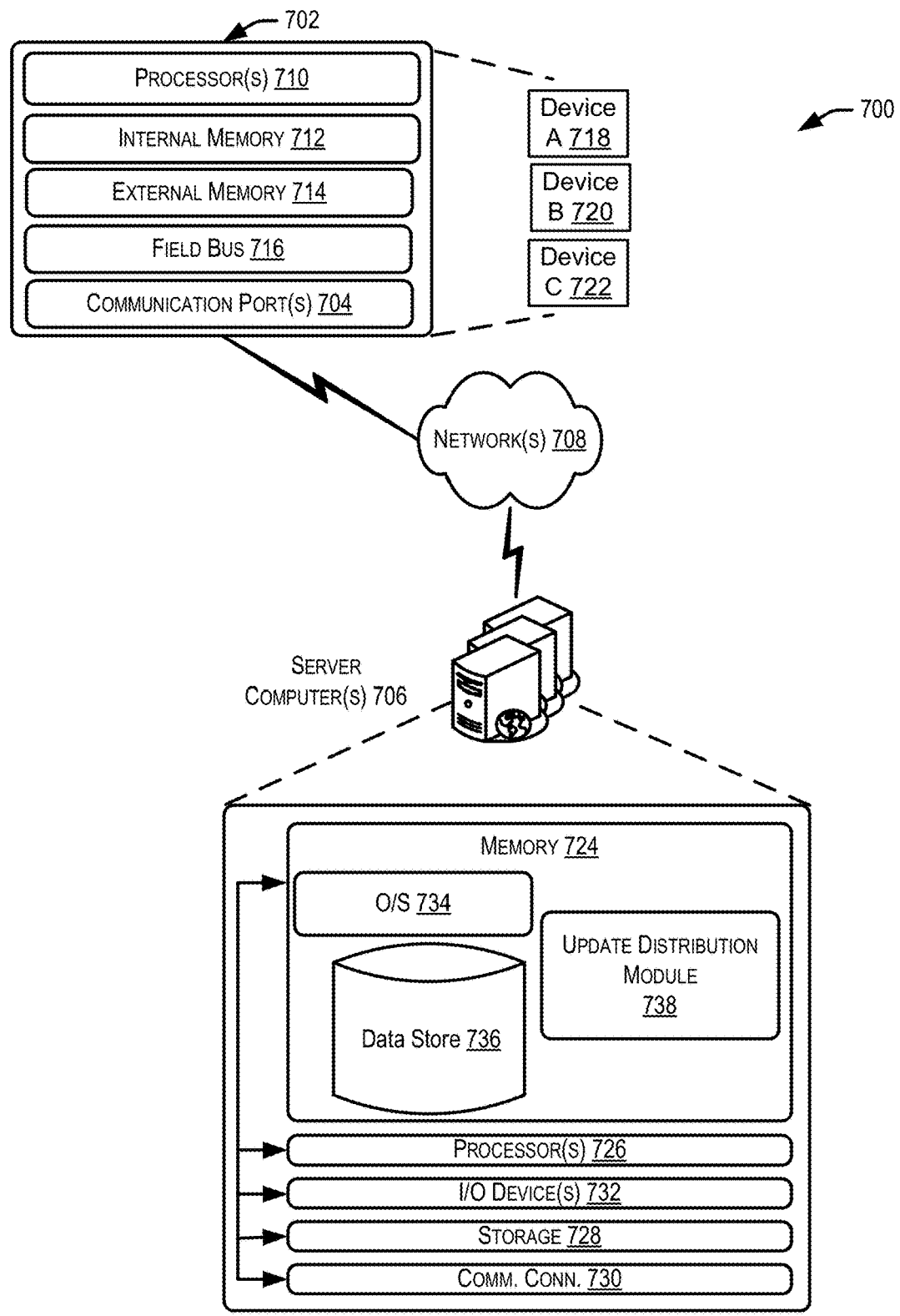
FIG. 7 illustrates an example architecture for implementing a feature for distributing automatic updates to controller systems that includes a machine controller system, a network, and a server computer, in accordance with at least one embodiment.

FIG. 7 illustrates an example architecture for implementing a feature for distributing automatic updates to controller systems that includes a machine controller system, a network, and a server computer, in accordance with at least one embodiment. In architecture 700, one or more machine controller systems 702 may utilize communication port(s) 704 to communicate with server computer(s) ("server computer") 706 via networks 708. In architecture 700, the one or more machine controller systems 702 may include processor(s) or processing units 710, internal memory 712, external memory 714 and a field bus 716. The internal memory 712 and external memory 714 may store program instructions that are loadable and executable on the processor(s) 710, as well as data generating during execution of these programs. Depending on the configuration of the machine controller systems 702, the internal memory 712 may be volatile (such as random access memory (RAM)) and/or non-volatile (such as read-only memory (ROM), flash memory, etc.). The external memory 714 may be non-volatile memory (such as read-only memory (ROM), flash memory, secure digital memory, etc.). In embodiments, the internal memory 712 and external memory 714 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the machine controller systems 702. In some implementations, the internal memory 712 and external memory 714 may include multiple different types of memory, such as static random access memory (SRAM), dynamic random access memory (DRAM), or ROM.

The machine controller system 702 may also include a field bus 716 that may include multiple analog and/or digital input and output (I/O) ports or connections for interfacing with electromechanical devices 718-722 associated with machine controller system 702. The field bus 716 may include any suitable local communications interface for communicating between the processor(s) 710, internal memory 712, external memory 714, and/or associated electronic mechanical devices. Examples of electromechanical devices 718-722 may include drive motors, electromechanical actuators (e.g., solenoids, switches, relays, robotic actuators, linear actuators, etc.), cameras and vision systems, scanners, sensors, timers, scales, label applicators, measurement devices (e.g., temperature sensors, humidity sensors, etc.), and other devices. The communication port(s) 704 may include suitable communication devices capable of communicating via networks 708 with server computer 706 such as via TCP/IP protocols or suitable Ethernet protocols.

The architecture 700 may also include one or more server computers 706 that may, in some examples, provide computing resources such as, but not limited to, client entities, low latency data storage, durable data store, data access, management, virtualization, hosted computing environment or "cloud-based" solutions, electronic content performance management, etc. The server computer 706 may implement the a feature for distributing automatic updates to controller systems described herein, and implement or be an example of the server computer(s) 106, 302, or 420 of FIGS. 1-4. The one or more server computers 706 may also be operable to provide site hosting, computer application development, and/or implementation platforms, combinations of the foregoing, or the like to one or more users via associated user devices (not pictured).

In some examples, the networks 708 may include any one or a combination of many different types of networks, such as cable networks, the Internet, wireless networks, cellular networks, and other private and/or public networks.

The one or more server computers 706 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more server computers 706 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more server computers 706 may be in communication with the machine controller system 702 via the networks 708, or via other network connections. The one or more server computers 706 may include one or more servers, perhaps arranged in a cluster or as individual servers not associated with one another.

In one illustrative configuration, the one or more server computers 706 may include at least one memory 724 and one or more processing units or processor(s) 726. The processor(s) 726 may be implemented as appropriate in hardware, computer-executable instructions, firmware, or combination thereof. Computer-executable instruction or firmware implementations of the processor(s) 726 may include computer-executable or machine-executable instructions written in any suitable programming language to perform the various functions described when executed by a hardware computing device, such as a processor. The memory 724 may store program instructions that are loadable and executable on the processor(s) 726, as well as data generated during the execution of these programs. Depending on the configuration and type of the one or more server computers 706, the memory 724 may be volatile (such as RAM) and/or non-volatile (such as ROM, flash memory, etc.). The one or more server computers 706 or servers may also include additional storage 728, which may include removable storage and/or non-removable storage. The additional storage 728 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 724 may include multiple different types of memory, such as SRAM, DRAM, or ROM.

The memory 724, the additional storage 728, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 724 and the additional storage 728 are all examples of non-transitory computer storage media. Additional types of non-transitory computer storage media that may be present in the one or more server computers 706 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more server computers 706. Combinations of any of the above should also be included within the scope of non-transitory computer-readable media.

The one or more server computers 706 may also contain communication connection interface(s) 730 that allow the one or more server computers 706 to communicate with a data store, another computing device or server, user terminals, and/or other devices on the networks 708 such as machine controller system 702. The one or more server computers 706 may also include I/O device(s) 732, such as a keyboard, a mouse, a pen, a voice input device, a touch input device, a display, speakers, a printer, etc.

Turning to the contents of the memory 724 in more detail, the memory 724 may include an operating system 734, one or more data stores 736, and/or one or more application programs or services for implementing the features disclosed herein including the update distribution module 738. In accordance with at least one embodiment, the update distribution module 738 may be configured to at least maintain information about various machine controller systems, such as machine controller system 702, including versions of executable instructions currently utilized and versions of executable instructions available for the machine controller systems. The update distribution module 738 may determine when an update is available and generate a notification to be provided to the machine controller system 702 and/or a user device to notify an entity associated with the machine controller system about the update to the executable instructions. The update distribution module 738 may be configured to parse executable instructions into portions of code or binary files that may be transmitted to the machine controller system as well as generating and maintaining unique identification information that is provided with the portions of code or binary files for verification purposes. In embodiments, the update distribution module 738 may also update records or maintained information upon a complete or successful update of a machine controller system and maintain images or copies of executable instructions for machine controller systems that lack a locally stored version of the required executable instructions.

Figure 8:
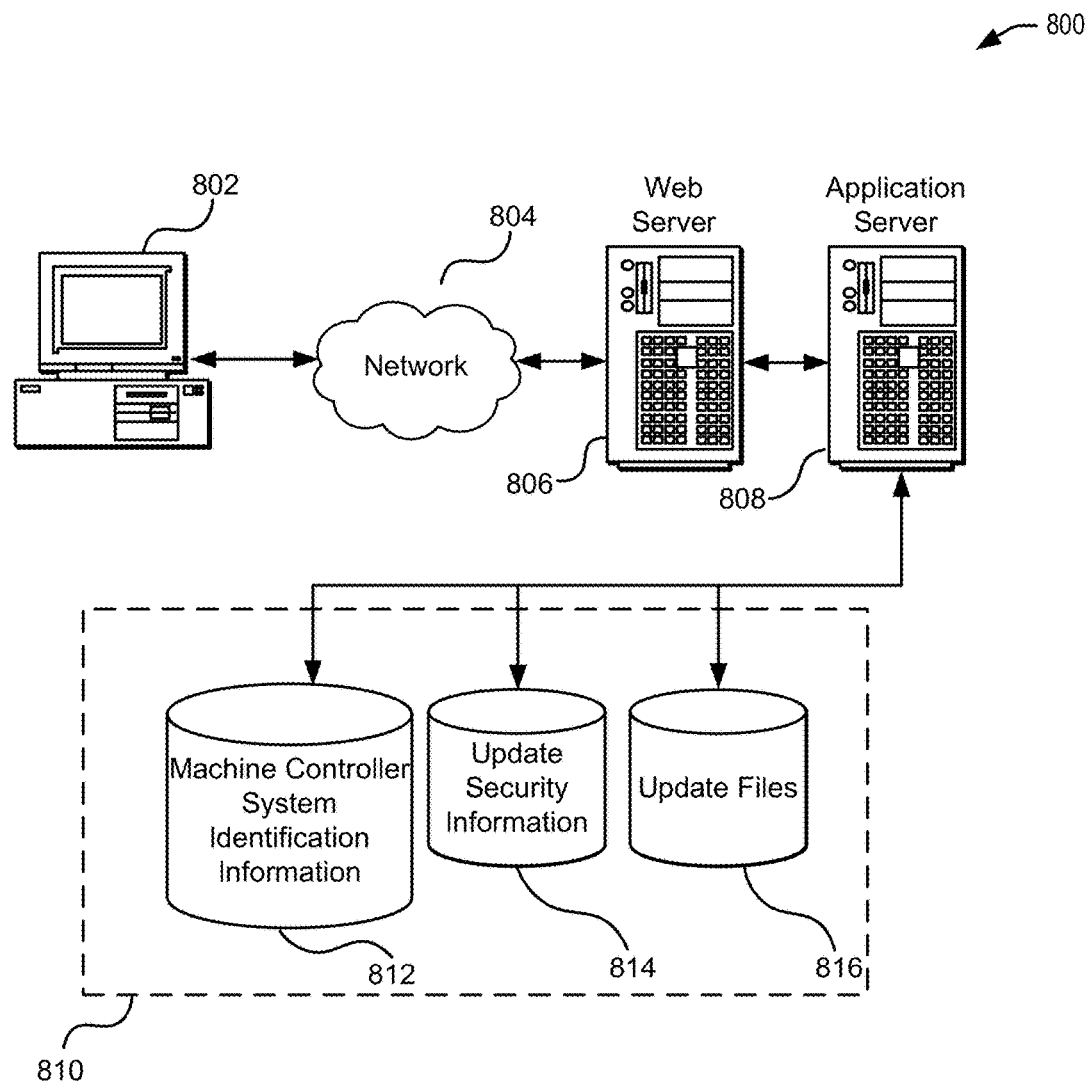
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing machine controller system identification information 812 and update files 816, which can be used to look up data utilized to identify and communicate with particular controller systems that require updates and retrieving particular portions of code or binary files and/or parsing executable instructions into portions of code or binary files for transmitting to the controller systems to facilitate updating the corresponding executable instructions. The data store also is shown to include a mechanism for storing update security information 814, which can be used for generating hashes, checksums, or other unique identification information for enabling verification, authentication, and security of portions of code and/or binary files provided to controller systems executing the boot-loader environment and compiling the portions of code into executable instructions. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, by a server computer via a network to a controller system, a notification identifying an update for the controller system;
    updating, by the controller system, a pointer file located on external memory of the controller system to re-direct to a boot-loader executable that is configured to receive and validate code for the controller system;
    executing the boot-loader executable in response to a first restart of the controller system;
    receiving, by the controller system and via the network from the server computer, instructions, updated code, and corresponding unique identification information for the updated code, the instructions specific for an integrated development environment (IDE) associated with the controller system;
    verifying, by the controller system, the updated code based at least in part on the unique identification information;
    compiling, by the controller system, the updated code into executable instructions for the controller system;
    storing, by the controller system, the executable instructions on the external memory of the controller system;
    updating, by the controller system, the pointer file located on the external memory to re-direct to the executable instructions based at least in part on the instructions; and
    in response to a second restart of the controller system executing the executable instructions for the machine controller system.

2. The computer-implemented method of claim 1, wherein storing the executable instructions on the external memory of the controller system includes overwriting previously stored executable instructions of the external memory for the controller system in response to successful verification of the updated code using the unique identification information, the executable instructions comprising instructions for reconfiguring operation of the controller system and associated electromechanical devices.

3. The computer-implemented method of claim 1, further comprising updating the pointer file located on the external memory to re-direct to previously stored executable instructions in response to an unsuccessful verification of the updated code using the unique identification information.

4. The computer-implemented method of claim 1, further comprising overwriting previous executable instructions stored on internal memory of the controller system with the executable instructions stored on the external memory in response to the second restart of the controller system.

5. The computer-implemented method of claim 1, wherein the unique identification information includes at least one of a hash value, a checksum value, or file name, and wherein verifying the updated code includes comparing the unique identification information for the updated code with the unique identification information maintained by the server computer.

6. A non-transitory computer-readable storage medium storing computer-executable instructions that, when executed by a machine controller system, configure the machine controller system to perform operations comprising:
    initiating a boot-loader environment stored in external memory of the machine controller system in response to a first restart of the machine controller system, the boot-loader environment configured to communicate with a server computer via a network to receive one or more portions of code for the machine controller system;
    receiving, via the network and from the server computer, the one or more portions of code for the machine controller system and instructions specific for an integrated development environment (IDE) associated with the machine controller system, the instructions identifying how to update a pointer file of the external memory;
    compiling the one or more portions of code into updated executable instructions for the machine controller system; and
    applying the updated executable instructions for the machine controller system in response to a second restart of the machine controller system.

7. The non-transitory computer-readable storage medium of claim 6, wherein the operations further comprise notifying an entity associated with the machine controller system about an update required for the executable instructions of the machine controller system.

8. The non-transitory computer-readable storage medium of claim 7, wherein notifying the entity includes updating a user interface of the machine controller system to identify the update for the executable instructions of the machine controller system.

9. The non-transitory computer-readable storage medium of claim 6, wherein the first restart of the machine controller system is in response to user input interacting with the machine controller system.

10. The non-transitory computer-readable storage medium of claim 6, wherein the machine controller system comprises an external power component configured to restart the machine controller system upon interaction by a user.

11. The non-transitory computer-readable storage medium of claim 10, wherein the first restart of the machine controller system is in response to instructions from the server computer and via the network to the external power component of the machine controller system.

12. The non-transitory computer-readable storage medium of claim 6, wherein the operations further comprise verifying each portion of the one or more portions of code prior to compiling the one or more portions of code into the updated executable instructions based at least in part on unique identification information associated with the one or more portions of code received from the server computer.

13. The non-transitory computer-readable storage medium of claim 6, wherein the operations further comprise updating the pointer file of the external memory to re-direct to the updated executable instructions based at least in part on the instructions.

14. The non-transitory computer-readable storage medium of claim 6, wherein the one or more portions of code for the machine controller system are received from a proxy server in communication with the server computer, the proxy server being within a threshold geographical distance from the machine controller system.

15. A computer system comprising:
volatile memory configured to store computer-executable instructions;
non-volatile memory configured to store the computer-executable instructions; and
a processor in communication with the volatile memory and the non-volatile memory configured to execute the computer-executable instructions to at least:
initiate a boot-loader environment stored in the non-volatile memory of the computer system in response to a first boot cycle of the computer system, the boot-loader environment configured to communicate with a server computer via a network to receive one or more portions of code for compiling executable instructions for operating the computer system;
receive, via the network and from the server computer, the one or more portions of code for the computer system and instructions specific for an integrated development environment (IDE) associated with the computer system, the instructions identifying how to update a pointer file of the non-volatile memory;
compile the one or more portions of code into the executable instructions for the computer system; and
apply the executable instructions for the computer system in response to a second boot cycle of the computer system.

16. The computer system of claim 15, wherein the processor is further configured to execute the computer-executable instructions to at least update the pointer file of the non-volatile memory to re-direct to the boot-loader environment subsequent to applying the executable instructions for the computer system and based at least in part on the instructions.

17. The computer system of claim 15, wherein the processor is further configured to execute the computer-executable instructions to at least receive, via the network and from the server computer, unique identification information associated with the executable instructions.

18. The computer system of claim 17, wherein the processor is further configured to execute the computer-executable instructions to at least configure a communication port of the computer system to communicate with the server computer, via the network, in response to receiving the unique identification information.

19. The computer system of claim 17, wherein the processor is further configured to execute the computer-executable instructions to at least authenticate each portion of the one or more portions of code with the server computer, via the network, based at least in part on the unique identification information.

20. The computer system of claim 15, wherein the processor is further configured to execute the computer-executable instructions to at least transmit, by the computer system to the server computer via the network, identification information for the computer system that is utilized by the server computer to retrieve the executable instructions specific to the computer system.

* * * * *